United States Patent [19]
Svensson

[11] Patent Number: 6,021,773
[45] Date of Patent: Feb. 8, 2000

[54] WIRE SAW

[75] Inventor: Anders Svensson, Huskvarna, Sweden

[73] Assignee: Hagby Asahi AB, Nora, Sweden

[21] Appl. No.: 09/210,659

[22] Filed: Dec. 14, 1998

Related U.S. Application Data

[63] Continuation of application No. PCT/SE97/01075, Jun. 17, 1997.

[30] Foreign Application Priority Data

| Jun. 17, 1996 | [SE] | Sweden | 9602371 |
| Aug. 16, 1996 | [SE] | Sweden | 9602996 |

[51] Int. Cl.$^7$ .................................................. B28D 1/08
[52] U.S. Cl. ............................... 125/21; 125/22; 125/18
[58] Field of Search ................................ 125/21, 22, 36, 125/18, 12, 13.01, 15, 17; 83/651.1, 661; 156/338, 324, 331.1, 901; 204/12, 27, 28; 264/236, 331.13, 347; 403/225, 299, 307, 334; 24/136 B, 136 L

[56] References Cited

U.S. PATENT DOCUMENTS

| 3,884,212 | 5/1975 | Armstrong et al. . | |
| 3,958,332 | 5/1976 | Gates et al. . | |
| 4,271,738 | 6/1981 | Deangelis . | |
| 4,654,972 | 4/1987 | Sellmaier et al. . | |
| 4,856,490 | 8/1989 | Kawase et al. | 125/21 |
| 4,907,564 | 3/1990 | Sowa et al. . | |

FOREIGN PATENT DOCUMENTS

| 160625 | 11/1985 | European Pat. Off. . |
| 364322 | 4/1990 | European Pat. Off. . |
| 749798 | 12/1996 | European Pat. Off. . |
| 3411283 | 8/1984 | Germany . |
| 3811265 | 10/1989 | Germany . |

OTHER PUBLICATIONS

Patent Abstract of Japan, vol. 14, No. 499, (M—1042) re JP-A-2-205410, Aug. 1990.

*Primary Examiner*—Derris Holt Banks
*Attorney, Agent, or Firm*—Pillsbury Madison & Sutro LLP

[57] ABSTRACT

In a wire saw primarily intended for sawing stone with the aid of light portable equipment, a continuous, easily flexed wire loop or wire on which cutting elements are uniformly spaced includes elastomeric spacing elements between the cutting elements. With the intention of increasing the flexibility of the wire loop and its ability to endure bending as it runs around guide sprocket wheels of small diameter, the diameter of the wire or the wire loop is reduced. A narrow waist bore which centers against the wire enables the cutting elements to be threaded in a centerd way on the wire. The spacing elements are applied thinly on the wire between the cutting elements. The elastomeric material functions to resiliently center the cutting elements by being pressed against the center plane of the cutting elements from both sides into recesses provided in the end-walls of the cutting elements, theses recess being flared at a wide angle of about 90 degrees.

8 Claims, 2 Drawing Sheets

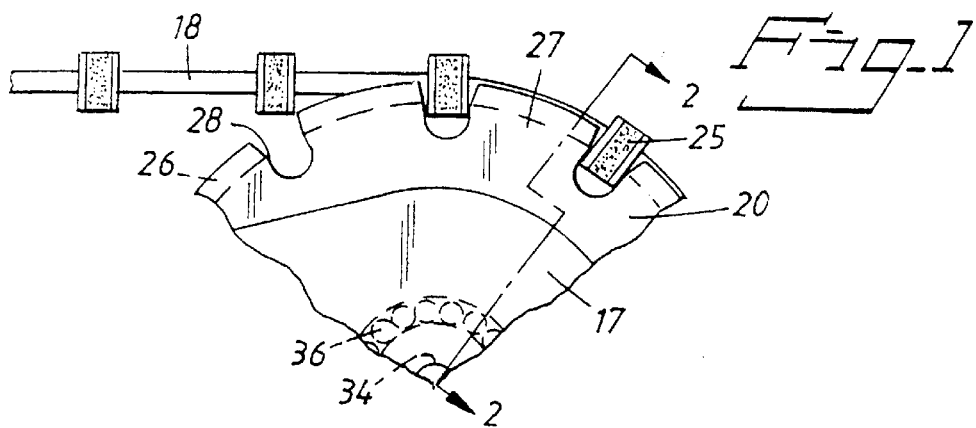
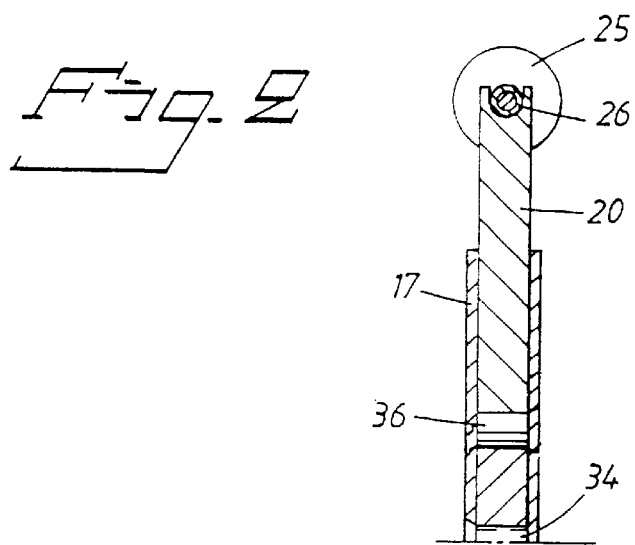
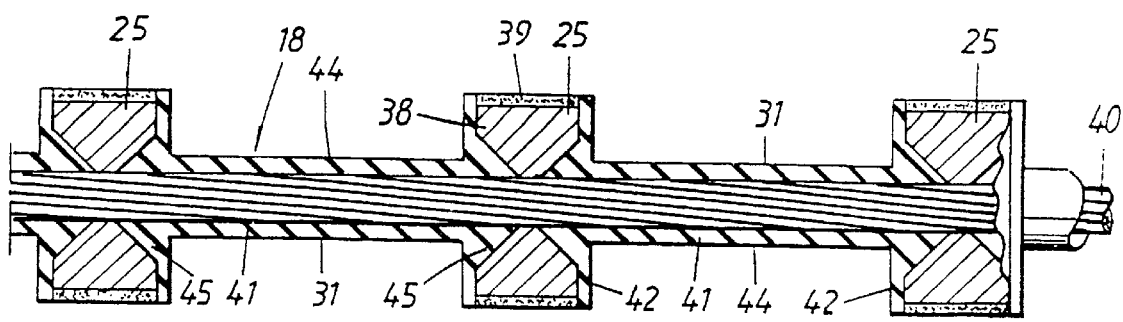

WIRE SAW

This case is a continuation of PCT/SE97/01075 filed Jun. 17, 1999.

FIELD OF THE INVENTION

The present invention relates to wire or cable saws of the kind that comprise a continuous wire loop provided with axially spaced cutting elements and circulating over a guide sprocket wheel, said wire loop comprising a wire onto which steel cores of said cutting elements are threaded, said cutting elements carrying a peripheral cutting part for sawing, and the wire being encased between the cutting elements in elastomeric spacing elements in a manner to non-rotatably affix said spacing elements on the one hand flexibly to and around the wire, and on the other to the adjacent end-walls of the steel cores.

BACKGROUND OF THE INVENTION

In the majority of cases, the steel cores of the cutting elements in this type of saws are coated with diamond powder or some other abrasive substance for sawing stone and concrete. In such applications, the machine equipment will normally be stationary and bulky, due to the fact that the limited flexibility of the typical wire saw requires the use of large guide sprocket wheels and strong wire loops. As a result of repeated bending and much use, the cutting element cores, threaded on the wire in broad proximity of or broad abutment with the wire or cable, tend to fracture particularly in the case of metal wires and or cables. This fracture tendency has been counteracted hitherto by increasing the diameter of the guide sprocket wheels and by greatly increasing the diameter of the wire or cable. On the other hand, if the distance between the inner surface of the cores and the wire is increased so as to afford the wire greater flexibility, there is a risk that the cores will be positioned obliquely by non-uniform pressure-forced penetration of elastomeric material into intermediate gaps from mutually opposite directions during manufacture, such cutting elements due to their misaligned periphery being prone to damage in a subsequent sawing operation. Non-uniform penetration of the elastomeric material is also liable to occur when the gap is narrow. Conventional designs are disclosed, for instance, in Patent Specifications U.S. Pat. No. 4,907,564, U.S. Pat. No. 3,884,212 and EP 0 364 322.

With the intention of creating more flexible wire saws suited as lighter machine equipment for sawing stone, for instance for hand-held chain-saw like machinery, endeavours must be directed towards reducing the diameter of the wire or cable while at the same time attaining a wire loop which can utilize the increased flexing ability with sufficient endurance against repeated bending around drive wheels and guide sprocket wheels, which would enable that the diameter of said wheels be reduced and the manageability of the equipment therewith improved. A reduction in the diameter of the guide sprocket wheel in portable tools of the chain-saw kind can further increase the manageability of the tool in use by virtue of the fact that this will enable more than one guide sprocket wheel to be mounted on the outer end of the saw blade. An example of a similar tendency in chain saws is disclosed in patent publication U.S. Pat. No. 4,654,972.

SUMMARY OF THE INVENTION

An object of the invention is to realize the endeavours mentioned in the preceding paragraph and to achieve said endeavours with respect to bending ability. This object is achieved by means of a wire saw defined in the claims accompanying this description.

BRIEF DESCRIPTION OF THE DRAWINGS

The invention will now be described in more detail with reference to the accompanying drawings, in which FIG. 1 is a fragmentary side view of the outer guide sprocket wheel on a saw blade carrying the inventive wire saw;

FIG. 2 is an enlarged sectional view taken on the line 2—2 in FIG. 1;

FIG. 3 is an enlarged longitudinal sectioned view of part of the wire saw shown in FIG. 1, and shows three cutting elements;

DETAILED DESCRIPTION OF THE INVENTION

Figure 4:
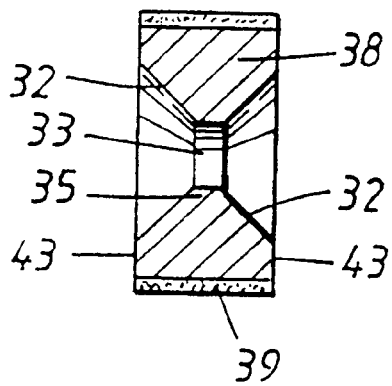
FIG. 4 is a sectional view of one of the cutting elements shown in FIG. 3.

The fragmentarily illustrated saw blade 17 shown in FIG. 1 by way of example forms part of a hand-held motor-driven saw of the kind described in Swedish Patent Application SE 9602371-8 or PCT/SE97/01074, concurrently filed with the present application, and to which reference is made for more detailed information. The saw blade 17 includes a shaft 34 about which a guide sprocket wheel 20 rotates about a bearing 36, these elements being gripped-around by both sides of the saw blade 17 in a fork-like manner. An endless belt-like element provided with cutting elements 25 and having the form of a closed, readily flexed wire or cable loop 18 is tensioned so as to run around the guide sprocket wheel 20 and the motor saw drive-wheel (not shown). The cutting elements 25 are threaded onto a wire or cable 40 comprised of steel or plastic strands (e.g. Kevlar™), that preferably have a diameter smaller than 5 mm, said cutting elements 25 being uniformly distributed on the wire loop 18.

The cutting elements 25 are comprised of an outwardly circular-cylindrical cutter core 38 of steel which carries a stone-cutting abrasive layer 39, e.g. including powdered diamonds or boron nitride in a suitable matrix material. With regard to examples of material used, reference is made here and in the following to publication U.S. Pat. No. 4,907,564 mentioned in the introduction. To enable the bodies of the cutting elements to be threaded onto and., at the same time, centred about the wire 40, the cutter cores 38 are configured with a narrow guide-waist 35 about a central, circular-cylindrical bore 33 the diameter of which is essentially equal to the diameter of the wire or cable 18 and which is intended to guidingly center the cutter core 38 on the wire 40. The axial extension of the bore 33 is smaller than the diameter of the wire 40 and is suitably about two-thirds the wire diameter. Extending axially at a wide angle in opposite directions from the central bore 33 in the waist part 35 are conically flared end-wall recesses 32 opening a cone angle suitably of about 45 degrees.

The diameter of the wire 40 is greatly reduced in relation to the cutting elements 25 and those parts of the wire 40 that extend between the cutter cores 38 are enclosed in a flexible, elastomeric spacing element 41, e.g. of rubber or polyurethane, which is affixed onto the wire 40 in the form of a relatively thin, readily flexed coating by being pressed, vulcanized or glued thereto, such that the spacing sleeve 41 is non-rotatably affixed to and around said wire 40. The application by pressure onto the wire portions located adjacent each cutting element 25 is performed simultaneously at the opposite end-walls 43 of the cutter cores 38 into the wide open end-wall recesses 32 with the cutter cores 38 centred around the wire 40 by the waist bore 33. Simultaneously, tooth or cog gaps 31 are formed in the intermediate part 44 of the spacing elements 41 between the respective cutters, the significance of which will be made apparent hereinafter. The tooth gaps 31 are delimited axially by mutually opposing end-flanges 42 which during pressure moulding of the elastomeric material are formed in abutment with the end-walls 43 of the cutter cores 38. As the elastomeric material is pressed around the wire and the tooth gaps 31 are formed, elastomeric material will enter the conically flared or end-wall recesses 32 under balancing action simultaneously from both sides, such as to bind against the surfaces of the recesses 32 and therewith prevent rotation of the wire therein, while maintaining the centred position of the cores 38 on the wire loop 18 or the wire 40. That prevents the abrasive layer 39 on the cutting elements 25 from being positioned obliquely in cutting position. When pressed on the wire 40, the spacing elements 41 obtain a bobbin-like configuration with pointed parts 45 that project into the recesses 32. Non-rotational binding of the wire can be further enhanced by giving the recesses 32 a square shape or a rough surface, e.g. a serrated surface structure, so as to obtain a more pronounced shape-bonding effect. In other respects, pressing of the elastomeric material on the wire between the cutting elements is suitably effected simultaneously along the full extent of the wire loop, subsequent to having threaded the cutting elements onto the wire and splicing the ends of the wire together. Step-by-step pressing can be applied in the case of long wire loops 18 provided, if required, with suitable means for joining their ends together.

As the wire loop 18 passes around the guide sprocket wheel 20, it co-acts with guide elements 26 on the periphery of the sprocket wheel 20 and the cutting elements 25 are adapted to drop into co-acting spaces or recesses 28 located between cog-like teeth 27 dispersed around said periphery. The guide elements are formed by a groove 26 on the tops of respective teeth 27 and extending around the periphery of the guide sprocket wheel. The wire loop 18 is guided and supported in the groove 26 between its walls, such that the cutting elements 25 will hang freely in the recesses 28 in those parts of the wire loop 18 that bridge or span said recesses. The guide sprocket wheel 20 thus has no contact with the cutting elements 25 and the teeth 27 on said sprocket wheel fall into the tooth gaps 31 between the end-flanges 42 in the elastomeric material and thereby also avoid metallic wearing contact.

The wire or cable 40 is twisted and its ends joined together to form a loop, preferably by splicing together the wire strands at said cable ends. Particularly in the case of circular-cylindrical cutting elements, splicing together or other joining, e.g. with the aid of screw thread connectors, is made angularly offset in relation to the longitudinal axis of the wire 40, such that the wire loop will have a figure-eight configuration prior to being fitted. When fitted around drive and guide sprocket wheels, the wire will therewith turn about its longitudinal axis so that the entire cylindrical cutting part 39 of the cutting elements 25 will successively provide a sawing effect.

Figure 5:
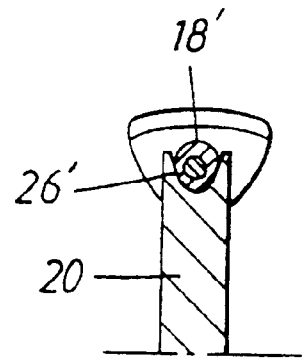
FIG. 5 is a sectional view of FIG. 2, and shows a variant of the wire saw intended for cutting elements with one-sided sawing without rotation of said elements about the longitudinal axis of the wire or cable; and, FIG. 6 is a sectional view of a modified wire saw which includes essentially non-reduced spacing elements between the cutting elements.

In the case of asymmetrical cutting elements, the wire ends are spliced or otherwise joined together without being angularly displaced and thus without a rotational tendency. Non-rotation of the wire loop in relation to its longitudinal axis in the case of one-sided abrasive cutting elements or in the case of teeth for sawing wood for instance, can suitably be ensured by adapting the engagement between the guide groove 26 on the guide sprocket wheel 20 and the tooth gaps 31 of the spacing elements 41, for instance by shape-bound engagement and non-round shape of the elastomeric covering and the groove 26 co-acting therewith. This is illustrated in FIG. 5, in which the rotation-preventing engagement of the wire loop 18' with the guide groove 26' is shown as a V-belt engagement.

The choice of a greatly reduced wire diameter, thin application of the spacing elements on the wire, and an increased extension of the elastomeric material in a direction towards the centre plane of the cutting elements from both sides simultaneously into the end-wall recesses 32, enhances the bending capacity of the wire loop 18 by damping the breaking load owing to the effect afforded by the elastic resiliency of the elastomer in the recesses 32. An inproved wire loop constructed in accordance with the invention may have the following dimensions, for instance: a spliced steel wire 40 (diameter 3 mm) with a diameter relationship of 3 to 11 in relation to the abrasive layer 39 (thickness 1 mm) on the cutting elements 25, and an elastomeric covering in the intermediate part 44 of the spacing elements 41 with a diameter of 4.5 mm around the wire parts 40 that extend between end-flanges 42, said flanges having a thickness of 0.5 mm.

Figure 6:
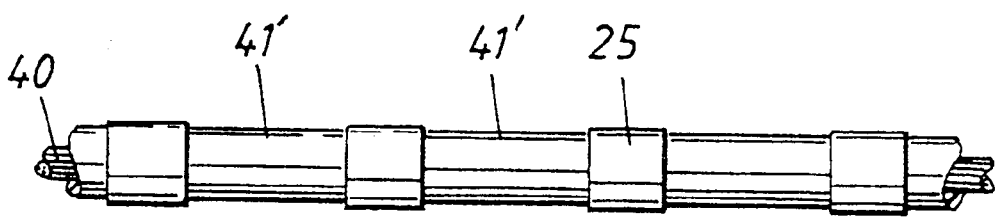

When wishing to use typical drive wheels and guide sprocket wheels of conventional type, i.e. drive wheels and guide sprocket wheels with wide rubber-lined guide grooves, the spacing elements 41', applied together with the improved centring principle of the cutting elements 25, can be made without tooth gaps and thicker up to close to the diameter or the cutting elements 25, as shown in FIG. 6. In accordance with the invention, the cutter cores 38 of this embodiment are constructed in the manner shown in FIG. 4, with the intention of increasing the flexibility of the wire loop 18 in the proximity of the cutting elements 25 and to ensure elastic centring of the cutting elements.

What is claimed is:

1. A wire saw, comprising:

a continuous wire loop;

cutting elements having steel cores with end-sides being axially spaced and provided on the continuous wire loop, wherein the continuous wire loop comprises a wire onto which the steel cores of the cutting elements are threaded;

a guide sprocket wheel, wherein the continuous wire loop circulates over the guide sprocket wheel, elastomeric spacing elements, wherein the wire is encased between the cutting elements in the elastomeric spacing elements in a manner to nonrotatably affix the elastomeric spacing elements flexibly to and around the wire and to the adjacent end-walls of the steel cores;

wherein the steel cores of the cutting elements define a waist portion having a central bore being cylindrically shaped, a diameter of the bore being essentially equal to a diameter of the wire, and the steel cores being centered on and abutting with the wire by way of the central bore, wherein the central bore merges with outwardly wide-angularly flared end-wall recesses defined at mutually opposite ends of the waist portion of the steel cores of the cutting elements, and wherein the elastomeric spacing elements have an arrow-shaped configuration wherein arrow points are pressed axially into the end-wall recesses, the arrow points from both sides resiliently centering the cutting elements relative to a longitudinal axis of the wire in a centered position defined by the waist portion of the steel cores.

2. A wire saw according to claim 1, wherein the spacing elements include intermediate parts which are adapted to guide the continuous wire loop around a periphery of the guide sprocket wheel as the continuous wire loop runs around the sprocket wheel while concurrently maintaining the cutting elements out of contract with the guide sprocket wheel.

3. A wire saw according to claim 1 or 2, wherein in order to increase flexibility, the intermediate parts of the spacing elements are applied thinly around the wire and reduced in relation to the end-walls of the steel cores so as to form a bobbin configuration together with the arrow points of the spacing elements.

4. A wire saw according to claim 1, wherein an axial extension of the central bore in the waist portion of the cutting element is smaller than the diameter of the wire, and is approximately two-thirds of the wire diameter.

5. A wire saw according to claim 1, wherein the end-wall recesses are frustoconically flared as viewed from the opposing ends of the steel cores of the cutting elements, and have a cone angle of generally 45 degrees in relation to a longitudinal axis of the central bore in the waist portion of the steel cores.

6. A wire saw according to claim 2, wherein the elastomeric spacing elements have end-flanges extending peripherally around end walls of the arrow points and axially abutting sides of the cutting elements.

7. A wire saw according to claim 2, wherein the sprocket wheel includes a guide means, wherein the cutting elements are one-sided cutting elements with a non-round shape, and wherein the intermediate parts of the spacing elements have an outer shape around the wire which engenders rotation-preventing, shape-bound co-action with the guide means on the guide sprocket wheel as the continuous wire loop runs around the sprocket wheel.

8. A saw according to claim 1, wherein the end-wall recesses of the steel cores are shape-bound secured to the spacing elements.

* * * * *